United States Patent
Subramanian

(10) Patent No.: US 12,379,287 B2
(45) Date of Patent: Aug. 5, 2025

(54) METHOD FOR A FLAT SPOT DETECTION

(71) Applicant: Volvo Truck Corporation, Gothenburg (SE)

(72) Inventor: Chidambaram Subramanian, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 169 days.

(21) Appl. No.: 18/342,816

(22) Filed: Jun. 28, 2023

(65) Prior Publication Data

US 2024/0053230 A1 Feb. 15, 2024

(30) Foreign Application Priority Data

Aug. 12, 2022 (EP) .................................... 22190081

(51) Int. Cl.
- *B60T 8/171* (2006.01)
- *B60T 8/172* (2006.01)
- *G01M 17/02* (2006.01)
- *G06N 3/08* (2023.01)

(52) U.S. Cl.
CPC ............. *G01M 17/02* (2013.01); *B60T 8/171* (2013.01); *B60T 8/172* (2013.01); *B60T 8/1725* (2013.01); *G06N 3/08* (2013.01)

(58) Field of Classification Search
CPC ........ B60T 8/171; B60T 8/172; B60T 8/1725; B60T 8/173; B60T 8/174; B60T 8/1862; B60T 2240/00; B60T 2240/04; G01M 17/02; G01M 17/021
USPC ......................................... 701/70, 71, 76, 77
See application file for complete search history.

(56) References Cited

U.S. PATENT DOCUMENTS

| | | | |
|---|---|---|---|
| 7,523,656 B1* | 4/2009 | Blixhavn | B60C 23/0411 73/146.5 |
| 7,688,218 B2 | 3/2010 | LeFebvre et al. | |
| 2004/0068374 A1* | 4/2004 | Shavers | G01M 17/024 702/1 |
| 2007/0083346 A1* | 4/2007 | Mani | B60C 99/006 703/2 |
| 2007/0205879 A1* | 9/2007 | Matsuda | B60T 8/17616 73/146 |
| 2008/0209995 A1 | 9/2008 | Taylor et al. | |
| 2008/0282799 A1* | 11/2008 | Douglas | G01M 1/16 73/460 |

(Continued)

FOREIGN PATENT DOCUMENTS

| | | |
|---|---|---|
| DE | 102010052667 A1 | 5/2012 |
| EP | 2432669 B1 | 3/2019 |

OTHER PUBLICATIONS

Extended European Search Report for European Patent Application No. 22190081.4, mailed Feb. 1, 2023, 8 pages.

*Primary Examiner* — Erick R Solis
(74) *Attorney, Agent, or Firm* — Withrow & Terranova, PLLC

(57) ABSTRACT

A method for detecting a flat spot of a tire of a first wheel of a vehicle. The method comprises obtaining a plurality of measurements indicative of an actuation and/or a motion of at least part of a suspension arrangement. The suspension arrangement is arranged to provide suspension for the first wheel. The method further comprises detecting that the tire has a flat spot by determining that the plurality of measurements fulfills one or more predetermined conditions.

14 Claims, 8 Drawing Sheets

(56) References Cited

U.S. PATENT DOCUMENTS

| | | |
|---|---|---|
| 2020/0130421 A1* | 4/2020 | Doyle .................. B60C 11/246 |
| 2021/0224971 A1* | 7/2021 | Levin .................... B60W 50/14 |
| 2021/0237896 A1 | 8/2021 | Bill |
| 2022/0289207 A1* | 9/2022 | Kraeling ................ H04W 4/46 |

* cited by examiner

METHOD FOR A FLAT SPOT DETECTION

RELATED APPLICATIONS

The present application claims priority to European Patent Application No. 22190081.4, filed on Aug. 12, 2022, and entitled "METHOD FOR A FLAT SPOT DETECTION," which is incorporated herein by reference in its entirety.

TECHNICAL FIELD

The invention relates to a method for detecting a flat spot of a tire of a first wheel of a vehicle. The invention further relates to a control unit, a vehicle, a computer program and a computer program medium.

The invention can be applied in heavy-duty vehicles, such as trucks, buses and construction equipment. The invention can also be applied in any other suitable vehicle such as a car.

BACKGROUND

Tires of heavy-duty vehicles such as trucks, buses, etc. tend to wear out quickly. The wear of the tires is exaggerated when vehicles are not fitted with an Anti-lock Braking System (ABS). Similarly, if a wheel is misaligned and/or a suspension is broken, wheels tend to wear out quickly. A worn out tire tend to be worn out in a manner which causes flat spots on the tire, also referred to as flat spotting. For example, flat spots may emerge when brakes in a braking arrangement lock up on a wheel/tire.

As used herein, by brakes "locking up" on wheels and/or tires, it is intended that a pressure is applied to the brake, which pressure is sufficient to stop rotation of the wheels/tires even though the vehicle is still moving. Besides an increased risk of flat spots, locked up tires provide less friction than tires which are spinning and braking.

As an example, FIG. 1 illustrates a wheel 1 with a worn out tire 2 in comparison with another wheel 3 with a non-worn out tire 4. The wear of the worn out tire 2 has caused flat spots 5 to emerge in the wheel 1. As the flat spots 5 makes the worn out tire 2 less round and of irregular shape, in contrast to the non-worn out tire 4, several performance degradations follow for a vehicle using the worn out tire 2, such as degraded performance of suspension, brakes and general tire performance.

It may be possible to alleviate some of the performance degradation of a worn out tire by installing an ABS module which reduces wear and thereby reduces or at least defers the emergence of flat spots on the tire. This is since an ABS module will release the brake pressure when the tire is locked and brake only when the wheel is not locked. This prevents from the tire flat spotting.

In a similar manner, passive brake force distribution logic may be used in a braking arrangement to reduce and distribute brake pressure to reduce a risk of brakes locking up when used.

While these solutions may reduce some of the performance impact of using flat spotted tires, they may not always be suitable or available for use, and flat spots may still eventually appear, and thus performance degradation for worn out flat spotted tires remain a problem.

SUMMARY

An object of the invention is to handle tire wear in vehicles in a more efficient manner.

According to a first aspect, the object is achieved by a method according to claim 1. Hence, there is provided a method for detecting a flat spot of a tire of a first wheel of a vehicle. The method comprises:
 obtaining a plurality of measurements indicative of an actuation and/or a motion of at least part of a suspension arrangement, the suspension arrangement being arranged to provide suspension for the first wheel, and
 detecting that the tire has a flat spot by determining that the plurality of measurements fulfills one or more predetermined conditions.

When the vehicle operating with the flat spotted first wheel, the actuation and/or the motion of at least part of the suspension arrangement operates differently in contrast to operating with a normal non-worn out wheel. This is since the suspension arrangement will suspend the first wheel differently when the flat spot is in contact with a road surface than when a round part of a tire is in contact with the road surface. It is thus possible to use the plurality of measurements to detect that the tire has a flat spot. As the flat spot is detected, it is possible to take appropriate action. For example, it is possible to replace the tire earlier to ensure that the vehicle operates with less performance degradations caused by worn out tires. It is also possible to adjust a braking configuration for the first vehicle, wherein the braking configuration accounts for that the first wheel has a flat spot which entails reduced braking performance for the first wheel. Hence, a more efficient manner of handling tire wear is achieved.

Optionally, the plurality of measurements comprises at least one measurement which indicates a vertical movement of the first wheel and/or indicates a movement and/or actuation of a component in the suspension arrangement caused by the vertical movement of the first wheel. In other words, the plurality of measurements will indicate that the first wheel is moving up and down, which is due to the flat spot causing a differing suspension every revolution of the first wheel. Hence by direct and/or indirect measurement of the vertical movement of the first wheel, it is detected that there is a flat spot on the first wheel.

Optionally, the suspension arrangement is a pneumatic suspension arrangement, and the plurality of measurements comprises at least one measurement which indicates any one or more out of an air flow, an air flow rate, an air pressure and/or an air pressure change of the pneumatic suspension arrangement.

When the suspension arrangement is a pneumatic suspension arrangement, the pneumatic suspension arrangement will adjust pneumatic suspension, ride height differently for the flat spot of the first wheel. This means that the pneumatic suspension arrangement with adjust the usage of pressurized air when the flat spot is in contact with the road surface, which causes a different use of pressurized air than when using a tire which is not worn out. Hence, the any one or more out of an air flow, an air flow rate, an air pressure and/or an air pressure change of the pneumatic suspension arrangement can indicate that there is a flat spot on the first wheel.

Optionally, determining that the plurality of measurements fulfills the one or more predetermined conditions comprises determining that measurement data from the plurality of measurement are at least partly periodic. In this way when there is a flat spot on the first wheel, the plurality of measurements will indicate different measurement data for every time the flat spot of the first wheel is in contact with the road surface. Hence when the measurement data from the plurality of measurement are at least partly periodic, it is considered that there is a flat spot on the first wheel.

Optionally, determining that the plurality of measurements fulfills the one or more predetermined conditions comprises transforming measurement data from the plurality of measurements to a frequency domain function, and detecting that at least one amplitude of the frequency domain function exceeds a predetermined amplitude threshold for a frequency below a first predetermined frequency threshold.

When transforming the measurement data from the plurality of measurements to the frequency domain function, such as using a Fast Fourier Transform (FFT), amplitude spikes higher than the predetermined amplitude threshold will appear around one or more frequencies when there is a flat spot in the first wheel. This is since the flat spot causes a difference in the plurality of measurements, the reason being that the plurality of measurements will change for every revolution of the first wheel depending on whether the flat spot or a round part of the first wheel contacts the road surface. The plurality of measurements will include measurement data corresponding to a suspension caused by the flat spot at the one or more frequencies. As noise may be a factor, and to account for unusual suspension in the suspension arrangement, high frequencies can be filtered out such as to only consider frequencies below the first predetermined frequency threshold. Hence when the at least one amplitude of the frequency domain function exceeds the predetermined amplitude threshold for a frequency below the first predetermined frequency threshold, it is considered that there is a flat spot on the first wheel.

Optionally, determining that the plurality of measurements fulfills the one or more predetermined conditions further comprises:
  obtaining an indication of a rotational speed of the first wheel and/or a vehicle speed of the vehicle,
  determining at least one frequency region of interest based on the rotational speed of the first wheel and/or the vehicle speed of the vehicle, and
  determining that an amplitude of the frequency domain function exceeds the predetermined amplitude threshold for a frequency in the at least one frequency region.

At different rotational speeds and/or vehicle speeds, it is possible to estimate the frequency area of interest with respect to the frequency domain function. This is since the spikes in the frequency domain function will only occur for frequencies corresponding to a full revolution of the first wheel with some margin of error, e.g., accounting for measurement errors and/or variation in speed. As the rotational speed of the first wheel and/or the vehicle speed is obtained, a frequency region of interest can be determined to detect flat spots with high accuracy. Thereby when any amplitude in the determined frequency region of interest exceeds the predetermined amplitude threshold it is considered that there is a flat spot on the first wheel.

Optionally, determining that the plurality of measurements fulfills the one or more predetermined conditions is performed by using a machine learning model with the plurality of measurements as input.

The machine learning model can in this way be trained to detect the flat spots with high accuracy. As machine learning models can be trained to distinguish small statistical differences in an accurate manner, the use of a machine learning model can improve accuracy in detecting flat spots and can make it possible to detect flat spots earlier. Additionally, any other measurements that may be affected by flat spotting can be added to training and using the machine learning model which may thus increase the accuracy of detecting flat spots.

Optionally, the machine learning model is trained using real-world and/or simulated measurements of at least one training vehicle comprising a tire with a flat spot, and wherein the real-world and/or simulated measurements indicate an actuation of at least part of a suspension arrangement and/or a motion of at least part of a suspension arrangement in the at least one training vehicle.

Thus, using the at least one training vehicle, it is possible to train the machine learning model for all types of measurements that may occur when operating the at least one vehicle using a flat spot on a wheel. To improve the flat spot detection accuracy, the at least one training vehicle can comprise many different vehicles of different vehicle types, e.g., with flat spots on different wheels. The at least one vehicle may be measured when operating on many different roads and road types.

Optionally, the method comprises:
  when detecting that the tire has a flat spot, triggering a reduction in a brake force to be applied to the first wheel by a braking arrangement of the vehicle.

As a reduction in the brake force applied to the first wheel is triggered, an improved handling of the worn out tire of the first wheel is achieved. Other brakes of the vehicle may instead be subject to a higher brake force, e.g., as to achieve a desired vehicle deceleration of the vehicle, without having to brake too much on the first wheel.

Optionally, the method comprises:
  obtaining a road profile for a road used by the vehicle, and
  adjusting the plurality of measurements based on the obtained road profile.

When the road profile indicates bumps and/or vertical changes, the plurality of measurements can thus be appropriately adjusted such that it is possible to more accurately detect flat spots for bumpy roads.

Optionally, the road profile is obtained by any one or more out of:
  obtaining the road profile from a local storage,
  receiving the road profile from a server,
  receiving the road profile from another vehicle, and
  measuring the road profile continuously using sensors in the vehicle and/or in a second wheel in front of the first wheel in a driving direction of the vehicle.

According to a second aspect, there is provided a control unit configured to perform the method according to the first aspect. The control unit may be an Electronic Control Unit (ECU).

According to a third aspect, there is provided a vehicle comprising a first wheel, a suspension arrangement for the first wheel, and the control unit according to the second aspect.

According to a fourth aspect, there is provided a computer program comprising program code means for performing the method according to the first aspect, when said program is run on a computer.

According to a fifth aspect, there is provided a computer program medium carrying a computer program comprising program code means for performing the method according to the first aspect, when said program is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the Drawings.

The drawings are schematic and not drawn to scale.

DETAILED DESCRIPTION

Figure 1:
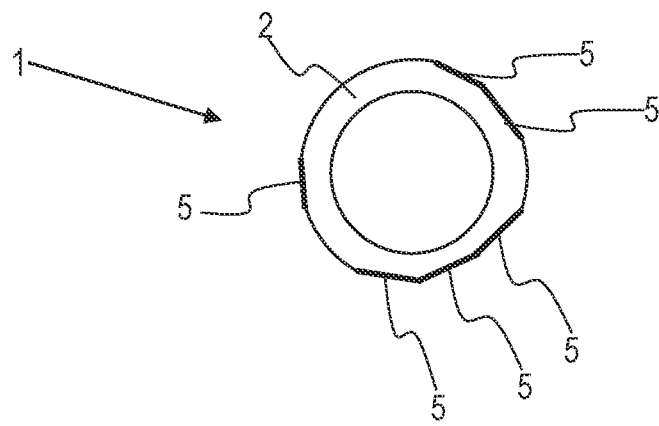
FIG. 1 is an illustration of a wheel with flat spots.
Figure 1:
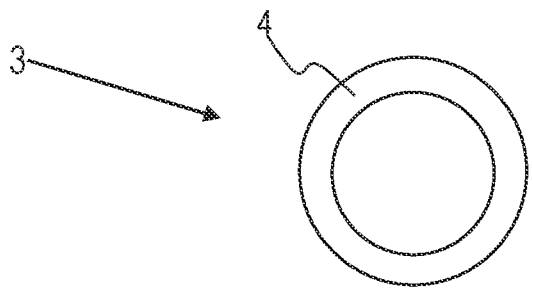
Figure 2:
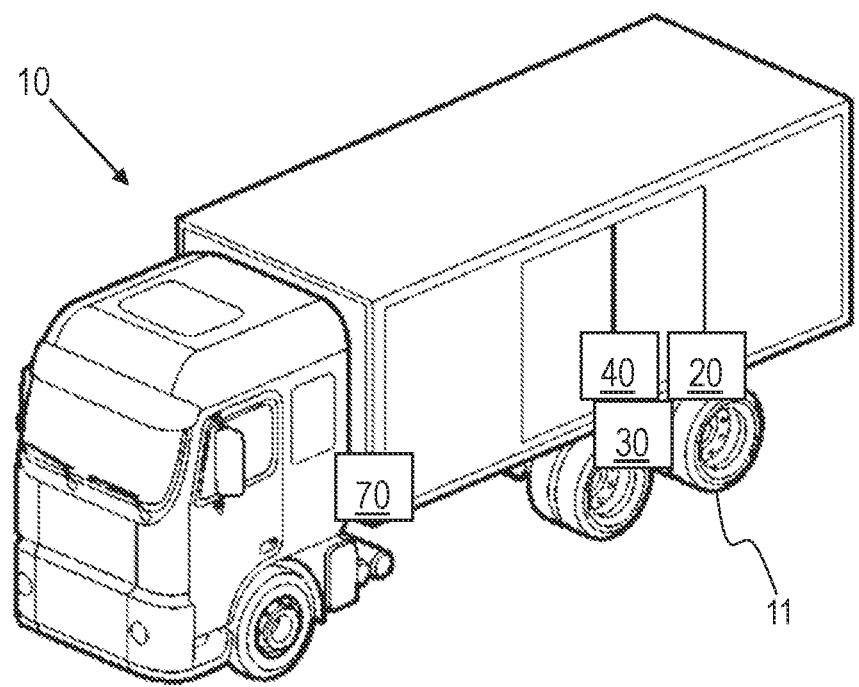
FIG. 2 is an illustration of a vehicle according to embodiments herein.
Figure 2:
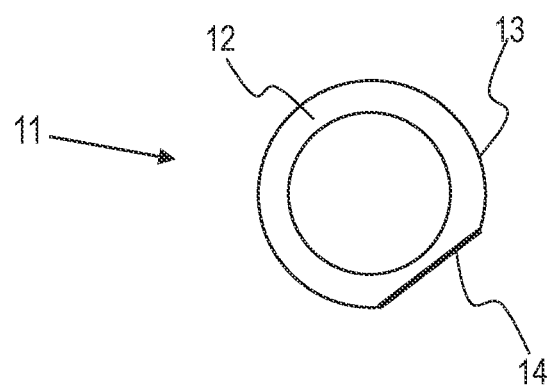

FIG. 2 illustrates a schematic overview of a vehicle 10. Although illustrated as a truck in FIG. 2, embodiments herein are applicable to any suitable vehicle e.g., any of a car, a truck, a bus, etc. The vehicle 10 may be manually operated by a user, e.g., a driver. The vehicle 10 may also be operated remotely and/or may be at least partly autonomous.

The vehicle 10 comprises a suspension arrangement 20 for a first wheel 11 in the vehicle 10. The suspension arrangement 20 may for example be a pneumatic suspension arrangement. The first wheel 11 may comprise a braking arrangement 40 comprising any suitable brake for decelerating/braking the vehicle 10 and the first wheel 11. Each other wheel of the vehicle 10 may have a same or similar corresponding suspension arrangement and braking arrangement as the first wheel 11. In FIG. 2, the first wheel 10 is arranged at the rear-part of the vehicle 10, however embodiments apply for any location of the first wheel 11 in the vehicle 10. For some embodiments, the first wheel 11 is a driven wheel, i.e., a wheel which is used for applying torque to at least partly propel the vehicle 10. This is since driven wheels transmit power, and if they are flat spotted, they will wear out much quicker resulting in performance degradations such as poor fuel efficiency.

The first wheel 11 may comprise a corresponding tire 12. The tire 12 may comprise a round part 13 and a flat spot 14. The flat spot 14 may comprise more than one flat spot.

In these embodiments, the suspension arrangement 20 comprises means for sensing the position of at least parts of the sensing arrangement 20 by the at least one sensor 30. The at least one sensor may be used to obtain a plurality of measurements indicative of an actuation and/or a motion of at least part of the suspension arrangement 20. In other words, the plurality of measurements, i.e., sensor data of the at least one sensor 30, may indicate that the suspension arrangement 20 operates differently than when operating using a non-worn out tire. The plurality of measurements may comprise measurement data, e.g., collected over time as a series.

This is since when the flat spot 14 contacts a road surface, the suspension arrangement 20 operates differently from when a non-worn out tire contacts the road surface. This causes measurement data from the plurality of measurements to indicate different data, e.g., typically resulting in and/or exhibiting a waveform or other at least partly periodic measurements even when driving on a flat surface. In other words, measurement data from the plurality of measurements will exhibit at least some periodicity in its data. Using the information of that there is a periodicity in the data measurement of the plurality of measurements, it can be determined that there is a flat spot on the tire 12. For example, the plurality of measurements may for example comprise at least one measurement which indicates a vertical movement of the first wheel 11 and/or indicates a movement and/or actuation of a component in the suspension arrangement 20 caused by the vertical movement of the first wheel 11. For example, it may be observed that the sensor data indicates a repeated change, i.e., a periodical change, in the plurality of measurements due to the flat spot 14 requiring different suspension, i.e., in vertical direction, due to the shape of the tire 12. As most suspension mechanisms may be affected by the flat spot 14, it may suffice that the plurality of measurements comprises any suitable suspension measurement of the suspension arrangement 20 which is affected by having to suspend the flat spot 14 differently from suspending a tire without flat spots.

Embodiments herein may be performed by a control unit 70. The control unit 70 may be comprised in the vehicle 10, e.g., as part of the suspension arrangement 20, but may also be comprised in any other suitable location communicatively connected with the pneumatic suspension arrangement 20 and/or any other corresponding pneumatic suspension arrangement in the vehicle 10. The control unit 70 may be communicatively coupled with the at least one sensor 30. The control unit 70 may be an ECU.

Figure 3:
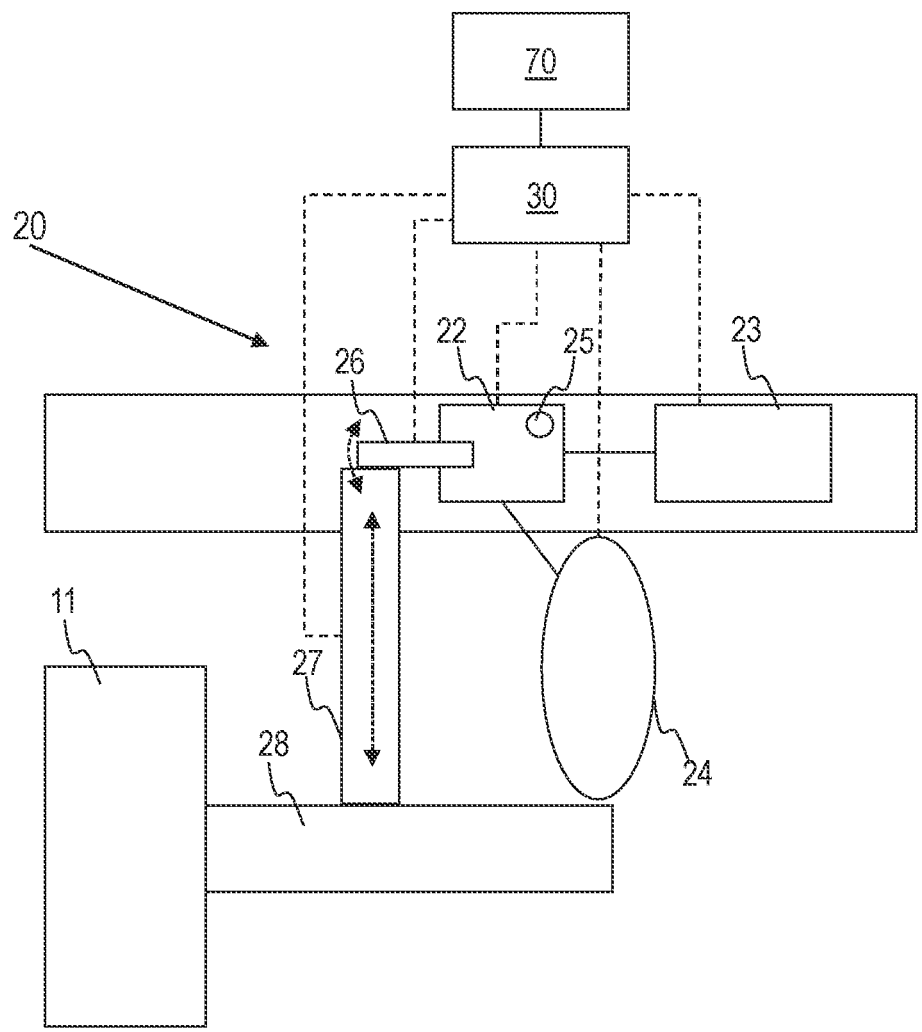
FIG. 3 is an illustration of a pneumatic suspension arrangement according to embodiments herein.

In some embodiments, the suspension arrangement 20 is a pneumatic suspension arrangement. An example pneumatic suspension arrangement is illustrated by FIG. 3. The plurality of measurements may in these embodiments comprise at least one measurement which indicates any one or more out of an air flow, an air flow rate, an air pressure and/or an air pressure change of the pneumatic suspension arrangement. As the air flow, air rate, air pressure, and/or pressure change will differ based on needing to suspend the flat spot 14 or not, any one or more out of these measurements can be used to detect the flat spot 14.

As illustrated in FIG. 3 the suspension arrangement 20 may be a pneumatic suspension arrangement which comprises a pneumatic flow control valve 22 which may be arranged to provide a closed circuit mechanism for suspension of the vehicle 10. As a ride height of the vehicle 10 falls below a ride height threshold, the pneumatic flow control valve 22 may be arranged to open an air flow between a source of pressurized air 23 and an air bag 24, and thereby filling pressurized air in the air bag 24 to increase the ride height. Similarly, if the ride height is more than a threshold, the pneumatic flow control valve 22 may be arranged to shut the path from the source of pressurized air 23 to the air bag 24 and open an air flow between the air bag 24 to the atmosphere via an exhaust port 25. Ride height may be obtained by the use of a control lever 26 and a push rod 27 connected to an axle 28 of the first wheel 11. The push rod 27 may move the control lever 26 when the ride height changes with respect to the axle 28, which thereby controls flow of pressurized air to the air bag 24. In this way, a mechanical mechanism for controlling the suspension of the first wheel 11 is provided. It shall be noted that other variants of pneumatic suspension arrangements may also be possible, and the above embodiment is merely one way of arranging the pneumatic suspension.

The at least one sensor 30 may be arranged to sense a movement and/or actuation of any one or more out of the components in the suspension arrangement 20. When the suspension arrangement 20 is a pneumatic suspension arrangement, the at least one sensor 30 may therefore comprise any one or more out of the following sensors:

a flow rate sensor, e.g., in the pneumatic flow control valve 22, a pressure sensor, e.g., in the pneumatic flow control valve 22, and a rotary and/or a position sensor, e.g., in the control lever 26 and/or in the push rod 27.

Figure 4:
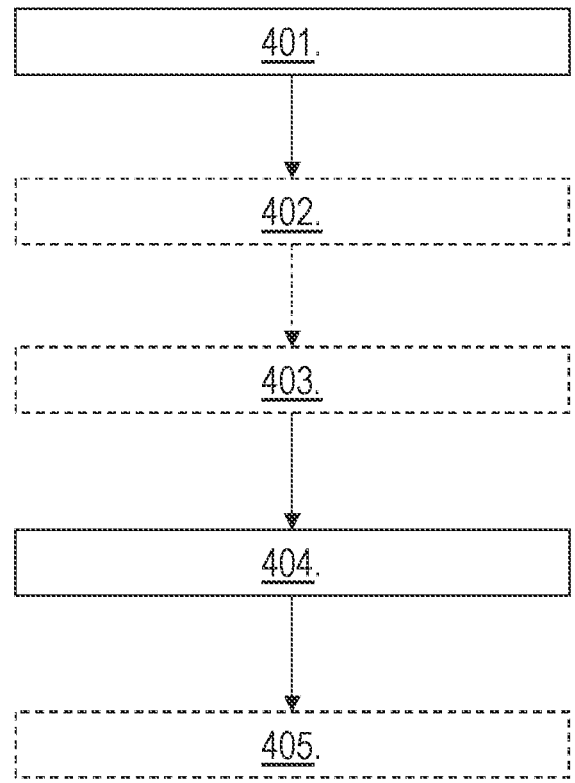
FIG. 4 is a flowchart of a method according to embodiments herein.

FIG. 4 illustrates a method for detecting a flat spot of the tire 12 of the first wheel 11 of the vehicle 10. The method may e.g., be performed by the control unit 70. The method may comprise one or more of the following actions, which may be taken in any suitable order. Dashed boxes in FIG. 4 indicates optional actions.

Action 401

The method comprises obtaining a plurality of measurements indicative of an actuation and/or a motion of at least part of the suspension arrangement 20. The suspension arrangement 20 is arranged to provide suspension for the first wheel 11. As the plurality of measurements indicate the actuation and/or the motion of the at least part of the suspension arrangement 20, when the vehicle 10 operates using a flat spot in the tire 12, the flat spot can be detected based on the plurality of measurements. This is since the actuation and/or the motion of the at least part of the suspension arrangement 20 behaves differently, thus affecting the plurality of measurements, when the flat spot is in contact with a road surface.

In some embodiments, the plurality of measurements comprises at least one measurement which indicates a vertical movement of the first wheel 11 and/or indicates a movement and/or actuation of a component in the suspension arrangement 20 caused by the vertical movement of the first wheel 11. In other words, the plurality of measurements may directly or indirectly be a measurement of an upward and/or downward movement of the first wheel 11, e.g., in relation to the suspension arrangement 20. If there is such an upward and/or downward movement, the plurality of measurements may be used to detect a flat spot in the tire 12.

In some embodiments, the suspension arrangement 20 is a pneumatic suspension arrangement 20, such as the one illustrated in FIG. 3. In these embodiments, the plurality of measurements comprises at least one measurement which indicates any one or more out of an air flow, an air flow rate, an air pressure and/or an air pressure change of the pneumatic suspension arrangement. As the air flow, air rate, air pressure, and/or pressure change will differ based on needing to suspend a flat spot of the tire 12, any one or more out of these measurements may be used to detect the flat spot 14.

Action 402

In some embodiments the method comprises obtaining road profile for a road used by the vehicle 10. The road profile may be obtained in any suitable manner, e.g., any one or more out of:

obtaining the road profile from a local storage, receiving the road profile from a server, receiving the road profile from another vehicle, measuring the road profile continuously using sensors in the vehicle and/or in a second wheel in front of the first wheel 11 in a driving direction of the vehicle 10.

When obtaining the road profile by measuring the road profile continuously using sensors in the vehicle and/or in a second wheel in front of the first wheel 11 in a driving direction of the vehicle 10, it is possible to dynamically measure the road and estimate the road profile of the road ahead. The measurements of the road may be performed by any suitable manner, e.g., by a camera and/or by a Light Detection and Ranging (Lidar) sensor. It may also be possible to use measurements of the suspension system of the second wheel, e.g., similar to the obtained plurality of measurements as obtained in action 401, to estimate the road profile. Estimating the road profile may be performed using a predetermined model and/or a trained machine learning model trained on a ground truth of the road profile and with sensor input from the corresponding suspension arrangement.

When receiving the road profile from another vehicle or from the server, the road may have been measured by at least one second vehicle previously operating on the road. The measurements of the road may be performed by any suitable means, e.g., by a camera and/or by a Lidar sensor. It may also be possible to use measurements of the suspension system of the at least one second vehicle, e.g., similar to the obtained plurality of measurements as obtained in action 401, to estimate the road profile. Estimating the road profile may be performed using a predetermined model and/or a trained machine learning model trained on a ground truth of the road profile and with sensor input from the corresponding suspension arrangement.

The embodiments herein may communicate road profiles and/or associated measurements using any suitable interface for communication such as a Vehicle to Anything (V2X) interface, Vehicle to Infrastructure (V2I) interface and/or a Vehicle to Vehicle (V2V) interface.

Action 403

In some embodiments the method comprises adjusting the plurality of measurements based on the obtained road profile, e.g., as obtained in action 402. In this way, when the road profile indicates bumps and/or vertical changes, the plurality of measurements can thus be appropriately adjusted such that it is possible to more accurately detect flat spots for bumpy roads.

For example, when there are natural bumps in the road surface on which the vehicle 10 is travelling, the parts of the measurements caused by the natural bumps may be removed, e.g., filtered, from the plurality of measurements.

Action 404

The method comprises detecting that the tire 12 has a flat spot by determining that the plurality of measurements fulfills one or more predetermined conditions. The one or more predetermined conditions may pertain to any suitable detection technique for establishing that there is a flat spot on the tire 12. The one or more predetermined conditions may depend on which one or more measurements are part of the plurality of measurements, i.e., which sensor data is used for sensing that the suspension arrangement 20 behaves differently due to a flat spot of the tire coming into contact with the road surface every revolution of the first wheel 11.

In some embodiments, determining that the plurality of measurements fulfills the one or more predetermined conditions comprises determining that measurement data of the plurality of measurement are at least partly periodic. In other words, the measurement data from the plurality of measurements may comprise/exhibit a wave form, or may have pulses and/or spikes which may be found in the plurality of measurements in a periodic pattern. The periodic pattern may mean that some of the pulses and/or spikes may be modelled with a periodicity, e.g., including some margin of error.

In some embodiments, determining that the plurality of measurements fulfills the one or more predetermined conditions comprises transforming measurement data from the plurality of measurements to a frequency domain function, and detecting that at least one amplitude of the frequency domain function exceeds a predetermined amplitude threshold for a frequency below a first predetermined frequency threshold.

In other words, measurement data from the plurality of measurements are transformed to a frequency domain, which makes it possible to analyze the plurality of measurements as accumulated over several revolutions of the first wheel 11. Very high frequencies may be filtered out, e.g., higher than or equal to the first predetermined frequency threshold. This is since very high frequencies may pertain to noise which may be repeated faster than a revolution of the first wheel 11. Such noise may be originated from vibrations of the vehicle 10, such as high frequency structural vibrations. Similarly, very low frequencies may be filtered out, e.g., lower than a second predetermined frequency threshold. This is since very low frequencies may pertain to noise resulting from occasional operations performed by a driver of the vehicle 10, speed bumps in a road, and/or any other noise which may appear less often than every revolution of the first wheel 11. The revolution and/or revolution rate of the first wheel 11 depends on the speed of the vehicle 10.

In some embodiments, determining that the plurality of measurements fulfills the one or more predetermined conditions further comprises:
 obtaining an indication of a rotational speed of the first wheel 11 and/or a vehicle speed of the vehicle 10, e.g., using a speedometer and/or a sensor which senses the rotational speed of the first wheel 11,
 determining at least one frequency region of interest based on the rotational speed of the first wheel 11 and/or the vehicle speed of the vehicle 10, and
 determining that an amplitude of the frequency domain function exceeds the predetermined amplitude threshold for a frequency in the at least one frequency region.

The at least one frequency region may be determined as a range of frequencies which may be relevant to the frequency domain function. The at least one frequency region may for example be determined by estimating which frequencies the flat spot of the tire 12 may be in contact with a road surface given the rotational speed and/or the vehicle speed. The at least one frequency region may be determined with some margin of error to account for that the rotational speed and/or the vehicle speed may increase and/or decrease. Thus, amplitudes in the transformed frequency domain function relates to, with some margin of error, the frequencies for which measurement data of a flat spot may appear, and thus, when an amplitude of the frequency domain function exceeds the predetermined amplitude threshold for a frequency in the at least one frequency region, it can be considered with high accuracy that there is a flat spot in the tire 12.

In some embodiments, determining that the plurality of measurements fulfills the one or more predetermined conditions is performed by using a machine learning model with the plurality of measurements as input. The trained machine learning model may for example comprise a Neural Network (NN) such as an Artificial NN (ANN), a Recurrent NN (RNN), or any other suitable machine learning model.

The machine learning model may be trained using real-world and/or simulated measurements of at least one training vehicle comprising a tire with a flat spot, and wherein the real-world and/or simulated measurements indicate an actuation of at least part of a suspension arrangement and/or a motion of at least part of a suspension arrangement in the at least one training vehicle. The at least one training vehicle may be one or more vehicles, e.g., truck(s), used with different component, tires, wheels, etc. The training of the machine learning model may comprise measurements of the at least one training vehicle operating using a flat spotted tire, and optionally also when operating using a tire which is not worn out. The trained machine learning model may be stored in the control unit 70 and/or at least partly in a server, e.g., as part of a cloud resource which may be obtained and/or used remotely using any suitable request from the control unit 70.

As an example, the trained machine learning model may be trained for the specific vehicle 10 making it optimized for the vehicle 10. Alternatively, the trained machine learning model may be trained for a generic vehicle or many different vehicles, e.g., based on a wide range of different vehicles.

In some embodiments, the training of the machine learning model can be trained without knowledge of the specific configuration of the vehicle 10. Training the machine learning model may as an example comprise:
 obtaining permutations and/or combinations of different vehicles, e.g., the at least one training vehicle, respective plurality of measurements, information of whether any one of the different vehicles has a flat spot on a tire and if so, optionally where on the tire it is located,
 optionally examining the permutations and/or combinations, e.g., to define any one or more out of data patterns of measurements for non-worn out tires and/or for flat spotted tires,
 optionally, setting boundary conditions for when or when not to consider that the plurality of measurements fulfills the one or more predetermined conditions, e.g., based on the defined patterns, and
 generating a machine learning model, e.g., a neural network, which can detect that there is a flat spot on the tire 12 based on the plurality of measurements.

Action 405

In some embodiments, the method comprises triggering a reduction in a brake force to be applied to the first wheel 11 by a braking arrangement 40 of the vehicle 10. The reduction is triggered in response to detecting that the tire 12 has a flat spot.

As a reduction in the brake force to be applied to the first wheel 11 when the brake force of the braking arrangement 40 is triggered, an improved handling of the worn out tire of the first wheel is achieved. Other brakes of the vehicle 10 may instead be subject to a higher brake force, e.g., as to achieve a desired vehicle deceleration of the vehicle 10, without having to brake too much on the first wheel 11.

FIGS. 5A-5H illustrate data which may be used for embodiments herein, indicating both data for operating both with a flat spot and without a flat spot on the tire 12. FIGS. 5A, 5C, 5E, and 5G are respective illustrations of road profiles on which the vehicle 10 may be driving on while obtaining the plurality of measurements, e.g., as obtained in action 401. The Y-axis for FIGS. 5A, 5C, 5E, and 5G may be of any suitable unit for measuring an altitude/vertical difference of the respective road profiles, e.g., meters relative to a starting point or meters above sea level.

FIGS. 5B, 5D, 5F, and 5H are respective data curves which may represent the plurality of measurements obtained over time, e.g., as obtained in action 401. The Y-axis for FIGS. 5B, 5D, 5F, and 5H may be of any suitable unit for measuring the plurality of measurements, e.g., for pneumatic suspension arrangements the Y-axis may relate to any unit for measuring an air flow, an air flow rate, an air pressure and/or an air pressure change of the pneumatic suspension arrangement, such as e.g., bar, angle, angular rate, radians per second, radians per meter, meter per second, any suitable air flow measurement such as an air flow rate, e.g., Standard Litre Per Minute (SLPM).

In the example scenarios FIGS. 5A-5D, the vehicle 10 operates without a flat spot on the tire 12. In the example scenarios FIGS. 5E-5H, the vehicle 10 operates with a flat spot on the tire 12.

Figure 5A:
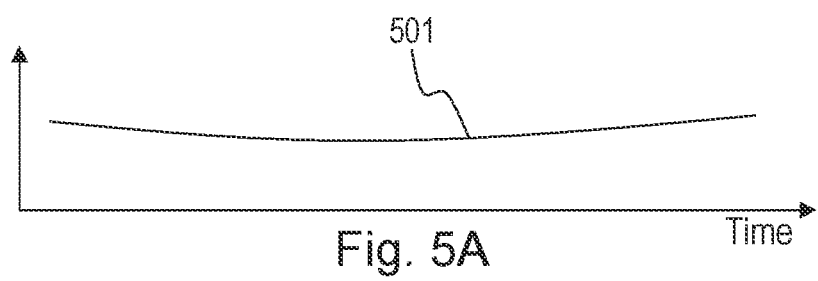
FIGS. 5A-5H are illustrations of data obtained for use by embodiments herein.
Figure 5B:
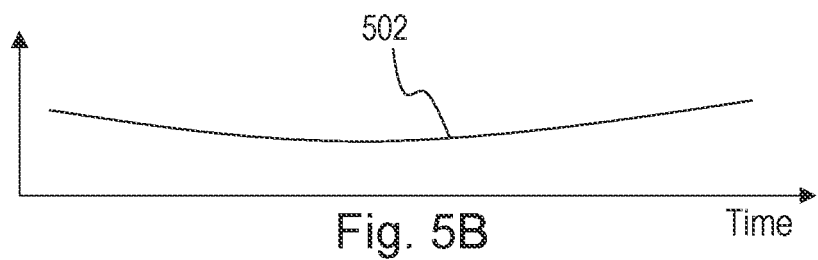

FIG. 5A illustrates a first road profile 501 of a first road with no major vertical changes. FIG. 5B illustrates first measurements 502 obtained while the vehicle 10 is driving on the first road. For the first measurements 502, the vehicle 10 does not have a flat spot on the tire 12. Hence, measurement data from the first measurements 502 exhibit a similar curve as the first road profile 501. This is since the suspension of the vehicle 10 will not change significantly besides corresponding to the first road profile 501.

Figure 5C:
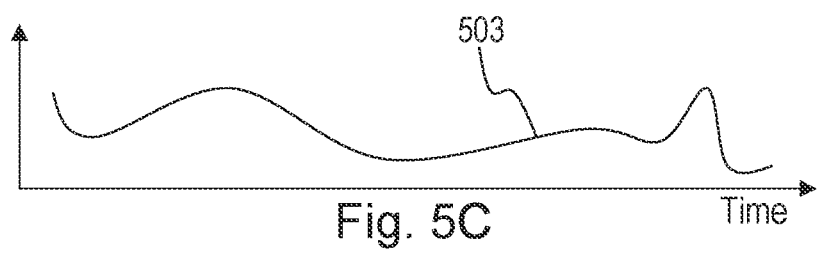
Figure 5D:
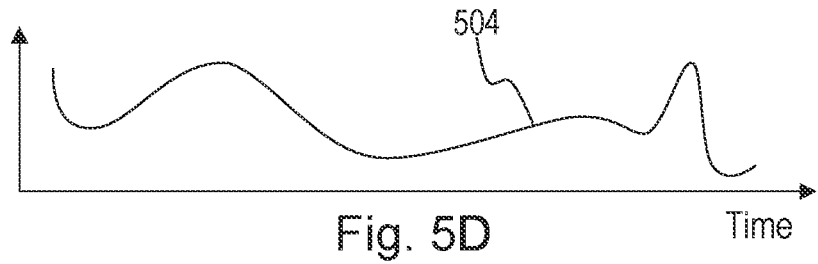

FIG. 5C illustrates a second road profile 503 of a second road with some vertical changes. FIG. 5D illustrates second measurements 504 obtained while the vehicle 10 is driving on the second road. For the second measurements 504, the vehicle 10 does not have a flat spot on the tire 12. Hence, measurement data from the second measurements 504 exhibit a similar curve as the second road profile 503. This is since the suspension of the vehicle 10 will not change significantly besides corresponding to the second road profile 503. The few changes/differences that may appear may relate to that the second road profile 503 and the second measurements 504 use different units, and hence the second measurements 504 may scale differently on the Y-axis than the second road profile 503.

Figure 5E:
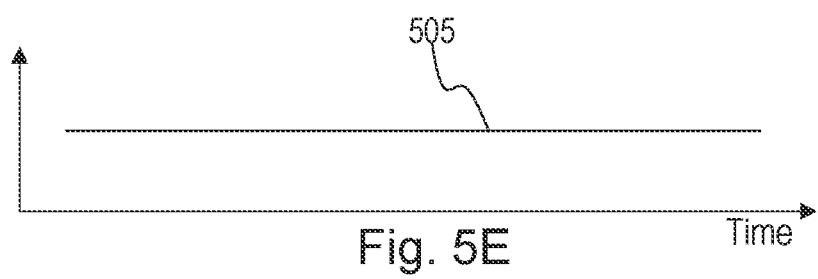
Figure 5F:
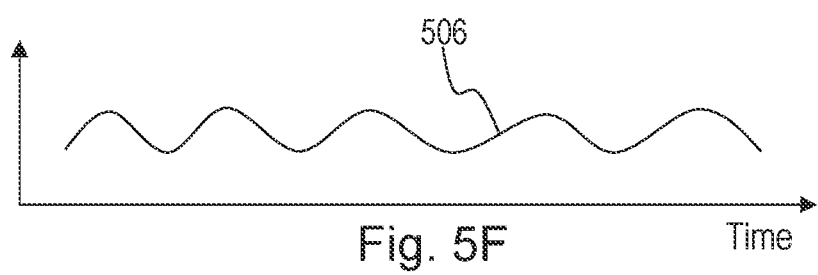

FIG. 5E illustrates a third road profile 505 of a third road with no major vertical changes. FIG. 5F illustrates third measurements 506 obtained while the vehicle 10 is driving on the third road, e.g., obtained as in action 402. For the third measurements 506, the vehicle 10 has a flat spot on the tire 12. Hence, measurement data from the third measurements 506 will exhibit a curve similar to the third road profile 505, but with a significant difference in that the measurement data from the third measurements 506 exhibit a third waveform, i.e., the measurement data from the third measurements 506 is at least partly periodical. For example, the third measurements 506 may be possible to model using one or more trigonometric functions, e.g., sinus waves, and the third road profile 505. The third waveform is caused by the flat spot in the tire 12 affecting the suspension in the suspension arrangement 20 by a small amount for every revolution of the first wheel 11. It shall be noted that the waveform illustrated in FIG. 5F is an illustrative example and other measurements with periodic behavior may also be applicable.

Figure 5G:
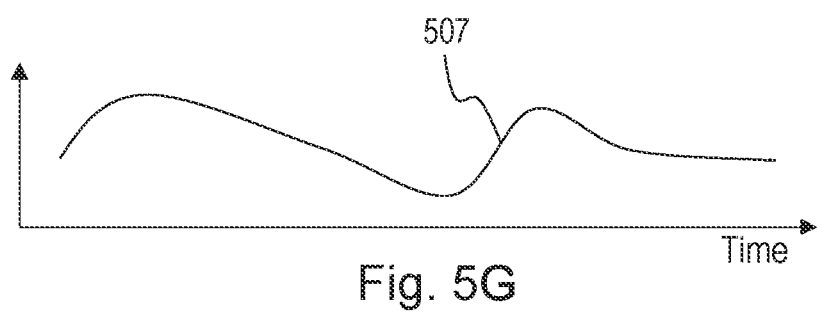
Figure 5H:
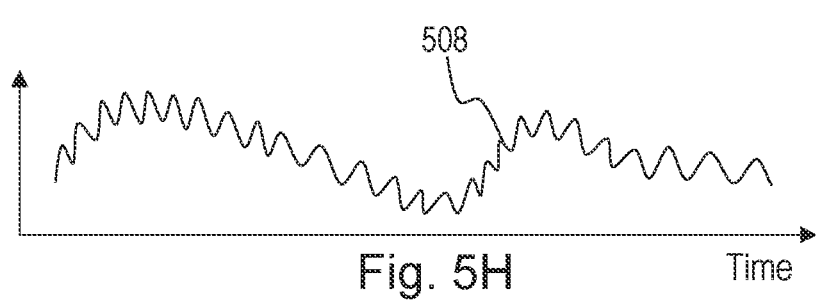

FIG. 5G illustrates a fourth road profile 507 of a fourth road with some vertical changes. FIG. 5H illustrates fourth measurements 508 obtained while the vehicle 10 is driving on the fourth road, e.g., obtained as in action 402. For the fourth measurements 508, the vehicle 10 has a flat spot on the tire 12. Hence, measurement data from the fourth measurements 508 will exhibit a curve similar to the fourth road profile 507, but with a significant difference in that the measurement data from the fourth measurements 508 exhibit a fourth waveform, i.e., the measurement data from the fourth measurements 508 is at least partly periodical. For example, the fourth measurements 508 may be possible to model using one or more trigonometric functions, e.g., sinus waves, and the fourth road profile 507. The fourth waveform is caused by the flat spot in the tire 12 affecting the suspension in the suspension arrangement 20 by a small amount for every revolution of the first wheel 11. It shall be noted that the fourth waveform illustrated in FIG. 5H is an illustrative example and other measurements with periodic behavior may also be applicable.

Figure 6:
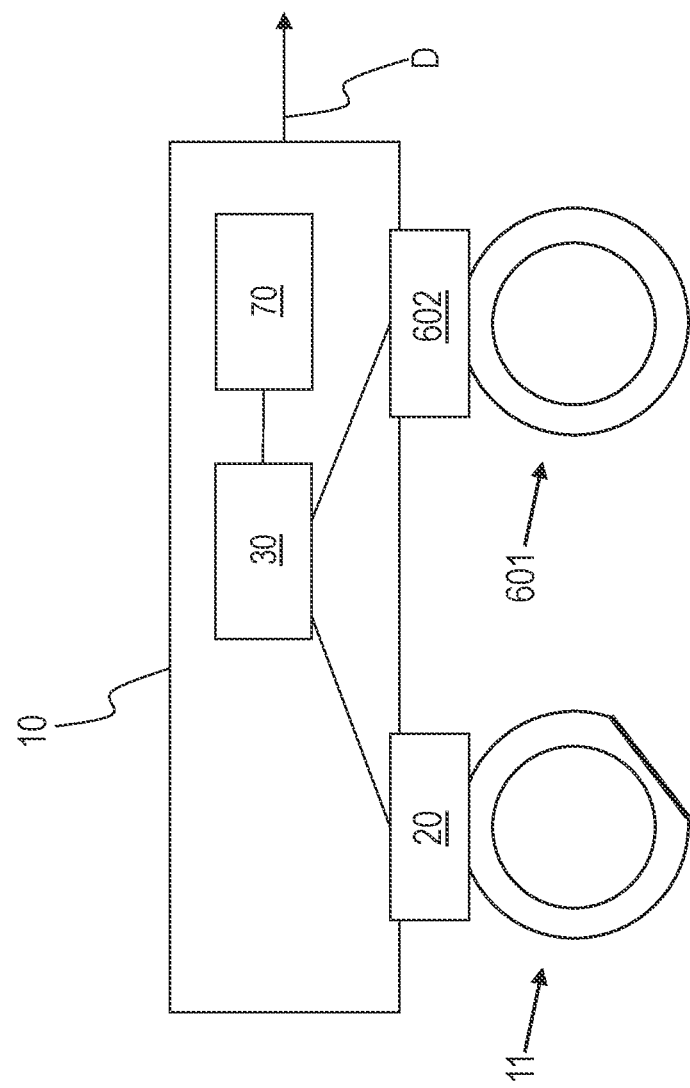
FIG. 6 is an example scenario illustrating embodiments herein.

FIG. 6 illustrates an example scenario herein wherein the first wheel 11 is a wheel placed in a rear part of the vehicle 10, at least behind a front wheel 601 of the vehicle 10, the front being in the driving direction D of the vehicle 10. The first wheel 11 is suspended by the suspension arrangement 20, e.g., as in any of the embodiments herein. The front wheel 601 is suspended by a front suspension arrangement 602. The front suspension arrangement 602 may be same as the suspension arrangement 20, such as illustrated in FIG. 3, but for the front wheel 601. The at least one sensor 30 comprises sensors for the suspension arrangement 20 and the front suspension arrangement 602. Additionally, the at least one sensor 30 may comprise a sensor which can measure a road profile ahead of the vehicle 10 in the direction D, e.g., to be used of actions 402-403. In these embodiments, the at least one sensor 30 may comprise any suitable sensor for measuring the road profile ahead of the vehicle 10 in the direction D, e.g., any one or more out of: a camera sensor and a Lidar sensor. Additionally or alternatively, the at least one sensor 30 may use sensor data from the front suspension arrangement 602 to estimate the road profile ahead of the vehicle 10 in the driving direction D. For example, when the front suspension arrangement 602 is a pneumatic suspension arrangement, the at least one sensor 30 may comprise any one or more out of the following sensors for the front suspension arrangement 602:

a flow rate sensor, e.g., in the pneumatic flow control valve 22, a pressure sensor e.g., in the pneumatic flow control valve 22, and a rotary and/or a position sensor, e.g., in the control lever 26 or in the push rod 27.

Using the at least one sensor, the control unit 70 may be able to both estimate the road profile of the vehicle 10, and to detect the flat spot of the tire 12 as in actions 401-405. In addition, when the road profile is obtained it is possible in some embodiments to have an active suspension which is adjusted based on the road profile. For example, when the suspension arrangement is a pneumatic suspension arrangement, using the road profile, stiffness and/or damping in the suspension arrangement 20 may be adjusted by varying the air pressure which improves ride comfort, reduces tire wear and also reduces consumption of pressurized air. An example in how this is achieved is that, if the road profile is detected as a rough profile, i.e., has a lot of vertical variation, the pneumatic suspension arrangement 20 would soften the air bag 24 illustrated in FIG. 3 to a level below a predetermined threshold where there is a ride comfort but where not too much of air is lost from the pneumatic control valve 22 due to the motion. At the same time, if a large bump is detected in the road profile, in order to optimize ride comfort the suspension arrangement 20 may be arranged to use the road profile and accurately set a stiffness value such that there is no sudden jerk felt in the sprung mass.

Fast Fourier Transform Usage

Transforming measurement data from the plurality of measurements to a frequency domain function, e.g., as in action 404, may in some embodiments be performed by means of performing an FFT, or a discrete FFT. The FFT is used to convert the at least part of the measurement data from the plurality of measurements from a time domain to the frequency domain. In order to use a less noisy frequency domain function, a PWELCH method may be used which leads to a higher accuracy. PWELCH, as used herein means a power-spectral density function which can be acquired from any suitable math library. PWELCH is a form of FFT. Any other suitable implementations or variations of FFTs and/or other suitable frequency transformation functions may also be used. Since the flat spot will be at a frequency based on the vehicle speed, using a speed signal of the vehicle 10 and the frequency domain function, it is possible to detect and estimate the amount of flat spotting, proportional to the power, and flat spot regions of the tire 12 corresponding to the frequency.

Estimating a Road Profile

For any embodiments herein road profiles may be measured and/or estimated by the use of the obtained measurements for the suspension arrangement for a wheel, e.g., an air flow rate, a control lever rotation/position, and/or pressure data, to estimate a corresponding road profile. To improve accuracy, the road profile may be further estimated based on a parametrization of any one or more out of: a tire, e.g., the tire 12, a vehicle Center of Gravity (CoG), e.g., the vehicle 10 CoG, a vehicle load, e.g., a suspension geometry, e.g., derived from the obtained measurements for the suspension arrangement for the wheel, e.g., an air flow rate, a control lever rotation/position, and/or pressure data.

Machine Learning

The machine learning model as used in embodiments herein may be trained in any suitable manner using obtained measurements and test data on obtained road profiles with known flat spotting conditions. The training data used to train the machine learning model may comprise measurements during different stages of flat spotting such as no flat spotting, minor flat spotting, moderate flat spotting and severe flat spotting. The training may comprise collecting sensor readings as an input/feature e.g., along with an axle load, a vehicle speed, and a flat spot status, e.g., the above flat spotting stage. Vast amounts of data need to be collected using permutation and combination for training the machine learning model, e.g., at least three data points in each feature. Features may include the sensor reading, vehicle speed, tire pressure and load. Once the training data is collected, manually tuning of the machine learning model may be performed, e.g., using any suitable method such as any one or more out of: fine tree, gaussian vector, ensemble bagged trees, support vector machines, deep neural network using a Levernberg-Marquardt method or Bayesian regularization or scaled conjugate method with different number of hidden layers and neurons. When the machine learning model comprises a neural network, the number of hidden layers and neurons of the neural network may be decided based on the training and testing of its performance. Tools like Python and MATLAB may be used for automating parts of the training process.

To perform the method actions described herein, the control unit 70 may be configured to detect a flat spot of a tire 12 of the first wheel 11 of the vehicle 10. The control unit 70 may be configured to perform any one or more of the above actions 401-405, and/or any of the other examples or embodiments herein. The control unit 70 may for example comprise an arrangement depicted in FIGS. 7A and 7B.

The control unit 70 may comprise an input and output interface 700 configured to communicate with any necessary components and/or entities of embodiments herein. The input and output interface 700 may comprise a wireless and/or wired receiver (not shown) and a wireless and/or wired transmitter (not shown). The control unit 70 may be arranged in any suitable location of the vehicle 10, e.g., as part of the pneumatic suspension arrangement 20. The control unit 70 may use the input and output interface 700 to control and communicate with sensors, actuators, suspension arrangements, subsystems, and interfaces in the vehicle 10, e.g., by using any one or more out of: CAN, ethernet cables, Wi-Fi, Bluetooth, and/or other network interfaces, e.g., V2X.

The control unit 70 may be configured to, e.g., by means of an obtaining unit 701 comprised in the control unit 70, obtain a plurality of measurements indicative of an actuation and/or a motion of at least part of the suspension arrangement 20. The suspension arrangement 20 is arranged to provide suspension for the first wheel 11.

The control unit 70 may be configured to, e.g., by means of the obtaining unit 701 comprised in the control unit 70, obtain a road profile for a road used by the vehicle 10.

The control unit 70 may be configured to, e.g., by means of the adjusting unit 702 comprised in the control unit 70, adjust the plurality of measurements based on the obtained road profile.

The control unit 70 may be configured to, e.g., by means of the detecting unit 703 comprised in the control unit 70, detect that the tire 12 has a flat spot by determining that the plurality of measurements fulfills one or more predetermined conditions.

The control unit 70 may be configured to, e.g., by means of the triggering unit 704 comprised in the control unit 70, when detected that the tire has a flat spot, trigger a reduction in a brake force to be applied to the first wheel 11 by the braking arrangement 40 of the vehicle 10.

Figure 7A:
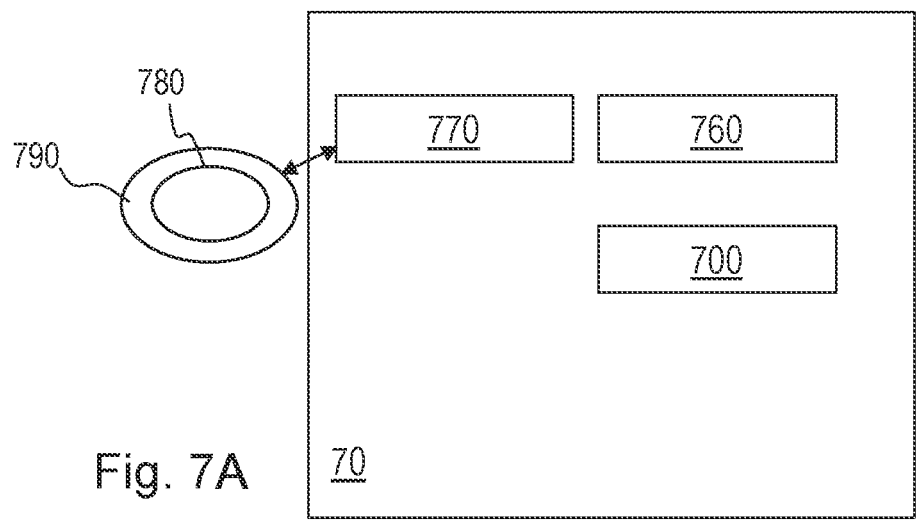
FIGS. 7A-7B are illustrations of a control unit according to embodiments herein.
Figure 7B:
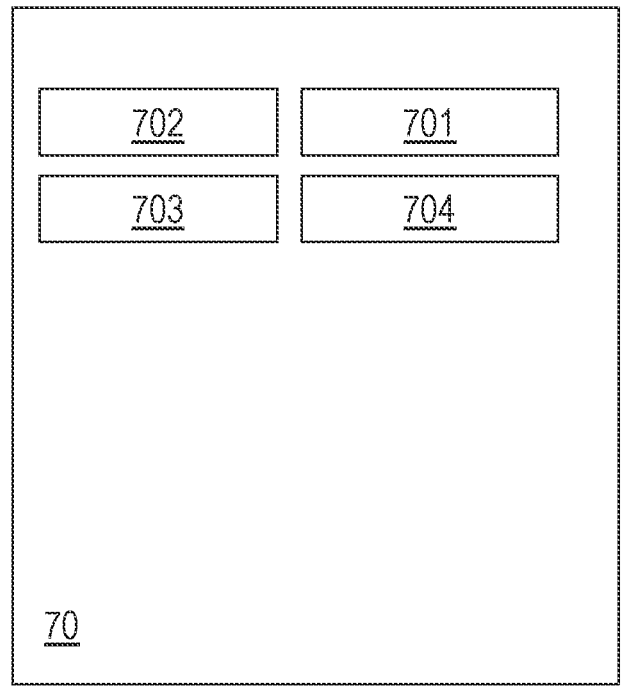

The embodiments herein may be implemented through a processor or one or more processors, such as a processor 760 of a processing circuitry in the control unit 70 depicted in FIG. 7A, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 770 comprising one or more memory units. The memory 770 comprises instructions executable by the processor in control unit 70. The memory 770 is arranged to be used to store e.g., information, indications, data, configurations, measurements such as sensor data, vehicle conditions, positioning information, scanned surroundings of the vehicle 10, road profile of a road to be used by the vehicle 10, and applications to perform the methods herein when being executed in the control unit 70.

In some embodiments, a computer program 780 comprises instructions, which when executed by a computer, e.g., the processor 760, cause the at least one processor of the control unit 70 to perform the actions 401-405 above.

In some embodiments, a computer-readable storage medium 790 comprises the respective computer program 780. The computer-readable storage medium 790 may comprise program code for performing the steps of any one of actions 401-405 above when said program product is run on a computer, e.g., the processor 760.

Those skilled in the art will appreciate that the units in the control unit 70 described above may refer to a combination of analogue and digital circuits, and/or one or more processors configured with software and/or firmware, e.g., stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC). Furthermore, the control unit 70 may comprise any suitable specialized circuits, e.g., for the machine learning model.

It is to be understood that the present invention is not limited to the embodiments described above and illustrated in the drawings; rather, the skilled person will recognize that many changes and modifications may be made within the scope of the appended claims. Furthermore, all above embodiments and/or examples may be combined in any suitable manner.

The invention claimed is:

1. A method for detecting a flat spot of a tire of a first wheel of a vehicle, the method comprising:
   obtaining a plurality of measurements indicative of an actuation and/or a motion of at least part of a suspension arrangement, the suspension arrangement being a pneumatic suspension arrangement and arranged to provide suspension for the first wheel; and
   detecting that the tire has a flat spot by determining that the plurality of measurements fulfills one or more predetermined conditions, the plurality of measurements comprising at least one measurement which indicates any one or more out of an air flow, an air flow rate, an air pressure, and/or an air pressure change of the pneumatic suspension arrangement.

2. The method of claim 1, wherein the plurality of measurements comprises at least one measurement which indicates a vertical movement of the first wheel and/or indicates a movement and/or actuation of a component in the suspension arrangement caused by the vertical movement of the first wheel.

3. The method of claim 1, wherein determining that the plurality of measurements fulfills the one or more predetermined conditions comprises determining that measurement data of the plurality of measurement are at least partly periodic.

4. The method of claim 1, wherein determining that the plurality of measurements fulfills the one or more predetermined conditions comprises transforming measurement data from the plurality of measurements to a frequency domain function, and detecting that at least one amplitude of the frequency domain function exceeds a predetermined amplitude threshold for a frequency below a first predetermined frequency threshold.

5. The method of claim 4, wherein determining that the plurality of measurements fulfills the one or more predetermined conditions further comprises:
   obtaining an indication of a rotational speed of the first wheel and/or a vehicle speed of the vehicle;
   determining at least one frequency region of interest based on the rotational speed of the first wheel and/or the vehicle speed of the vehicle; and
   determining that an amplitude of the frequency domain function exceeds the predetermined amplitude threshold for a frequency in the at least one frequency region.

6. The method of claim 1, wherein determining that the plurality of measurements fulfills the one or more predetermined conditions is performed by using a machine learning model with the plurality of measurements as input.

7. The method of claim 6, wherein the machine learning model is trained using real-world and/or simulated measurements of at least one training vehicle comprising a tire with a flat spot, and wherein the real-world and/or simulated measurements indicate an actuation of at least part of a suspension arrangement and/or a motion of at least part of a suspension arrangement in the at least one training vehicle.

8. The method of claim 1, further comprising:
   when detecting that the tire has a flat spot, triggering a reduction in a brake force to be applied to the first wheel by a braking arrangement of the vehicle.

9. The method of claim 1, further comprising:
   obtaining a road profile for a road used by the vehicle; and
   adjusting the plurality of measurements based on the obtained road profile.

10. The method of claim 9, wherein the road profile is obtained by any one or more out of:
    obtaining the road profile from a local storage;
    receiving the road profile from a server;
    receiving the road profile from another vehicle; and/or
    measuring the road profile continuously using sensors in the vehicle and/or in a second wheel in front of the first wheel in a driving direction of the vehicle.

11. A control unit configured to perform the method of claim 1.

12. A vehicle comprising a first wheel, a suspension arrangement for the first wheel, and the control unit of claim 11.

13. A computer program product comprising program code for performing, when executed by a computer, the steps of claim 1.

14. A non-transitory computer readable medium comprising a computer program comprising program code, which when executed by a computer, performs the steps of claim 1.

* * * * *